Aug. 12, 1969  E. M. HARRINGTON  3,460,183

TROWEL

Filed March 10, 1967

INVENTOR.
EUGENE M. HARRINGTON
BY
Christie, Parker & Hale
ATTORNEYS.

United States Patent Office 3,460,183
Patented Aug. 12, 1969

3,460,183
TROWEL
Eugene M. Harrington, 3672 Holboro Drive,
Los Angeles, Calif. 90027
Filed Mar. 10, 1967, Ser. No. 622,197
Int. Cl. E01c 19/12
U.S. Cl. 15—235.4                              2 Claims

ABSTRACT OF THE DISCLOSURE

A trowel having its handle bonded to the trowel blade by an adhesive.

---

This invention relates to trowels, and more particularly to trowels that can be used to apply and smooth abrasive materials, such as cement or plaster.

In the past, trowels have comprised a flexible, thin steel blade to which a plurality of studs were welded or riveted, with a handle secured to the blade by means of the studs. In order to resist abrasion from the material to be worked and still be suitable for closed and precise work, the trowel blade has normally been manufactured of a relatively thin tempered steel. Tempered steel, however, does lend itself well to welding and tends to crystallize and become brittle at the weld point producing a relatively weak joint.

In the stud-welded type of trowel, repeated flexing of the blade or sudden striking of hard conglomerates has a tendency to cause the trowel to break at the weld points. In the riveted trowel, the blade has a tendency to loosen or separate from the rivets since the rivet head thickness is limited by the thickness of the blade (typically .025 in.) and hence provides limited support for the blade. In addition, the welds or rivets result in rigid edges at the point of joinder, which causes stress concentrations at these points and enhances failure of the blade.

SUMMARY OF THE INVENTION

A trowel constructed according to this invention eliminates shortcomings such as enumerated above. The trowel comprises a trowel blade, means for operating the trowel, a support extending between the opearting means and the blade, the support terminating adjacent the blade in an elongated flange, and an adhesive material disposed between the flange and the blade for securing the support to the trowel blade.

With the present invention, breakage of the trowel blade, due to the riveting or stud-welding of the handle to the blade, is significantly reduced. Furthermore, stress concentrations in limited areas and along rigid lines are avoided. Instead, the present trowel is manufactured without physically or metallurgically disturbing the trowel blade. The wide flange of the support distributes the stresses between the support and the trowel blade over a relatively wide area. The simple construction permits the trowel to be manufactured at a substantially lower cost than was possible in the past.

Since neither the physical nor the metallurgical characteristics of the blade need to be compromised in order to satisfactorily attach the handle to the blade, the trowel blade may be constructed of the mterial best suited for applying and smoothing materials, such as mastic, plaster, cement and the like. Since the adhesives normally contemplated for use with the invention are reactivatable, the blade can be removed for repair or replacement at an economical cost. Such an advantage is particularly worthwhile when it is desired to reblade a trowel having a handle fitted to the hand of the user.

DESCRIPTION OF THE PREFERRED EMBODIMENTS

Figure 1:
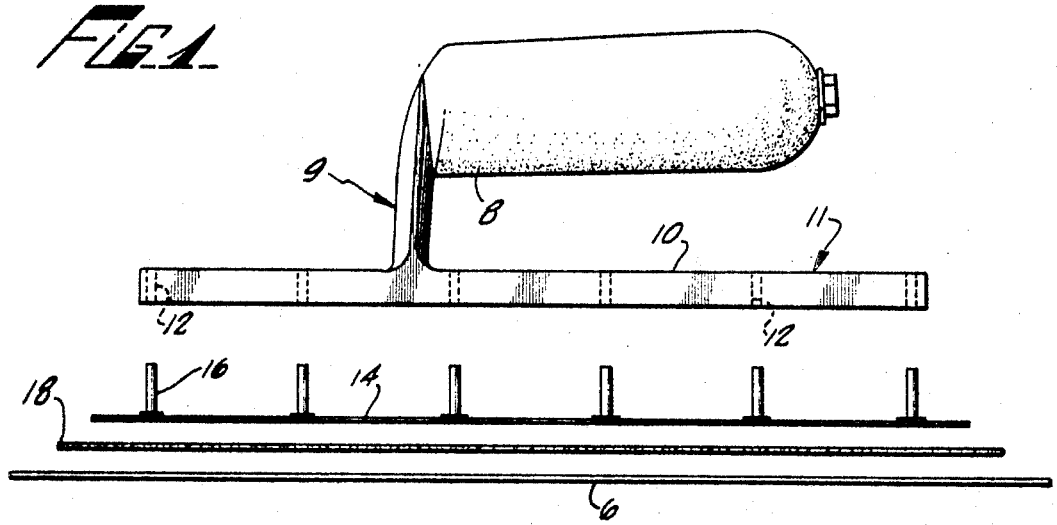
FIG. 1 is an exploded side elevational view of a hand-held type of trowel according to the present invention.
Figure 2:
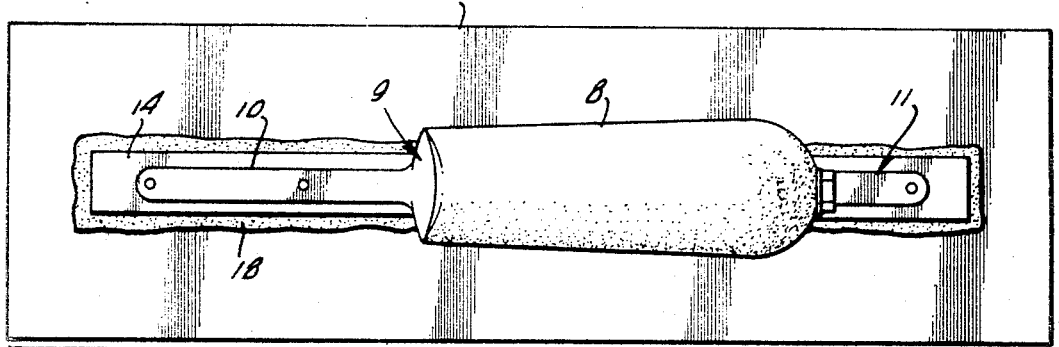
FIG. 2 is a plan view of an assembled hand-held trowel.
Figure 3:
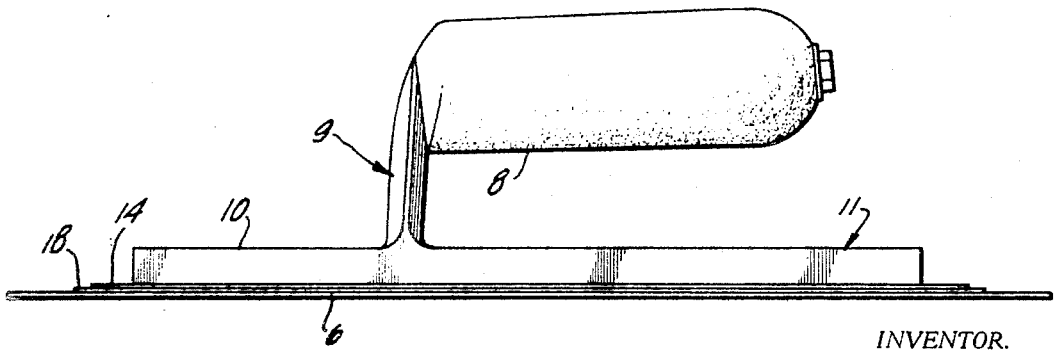
FIG. 3 is a side view taken along lines 3—3 of FIG. 2.

FIGS. 1 through 3 show a trowel constructed according to this invention. A trowel blade 6 is shown to have an elongated, rectangular configuration. This configuration is shown since it is the most commonly used. The blade, however, may be of any desired shape, such as round, oblong, triangular, etc.

In the presently preferred embodiment, a handle 8 is mounted on a support 9 having a base portion 11 terminating in an elongated planar flange 10. Support 9 is provided with a plurality of holes 12 passing through the base portion. An intermediate strip 14 is disposed between the blade and the flange and includes a plurality of studs 16 which are suitably secured to the strip, such as by stud welding. Strip 14 is secured to flange 10 by inserting the studs into holes 12 and squashing and grinding the stud heads into the base portion of the support. A layer of adhesive material 18 bonds the intermediate strip, the support and the handle to the trowel blade.

As best seen in FIG. 2, strip 14 is preferably of relatively long proportions such that it extends over a substantial portion of the length of the trowel blade. Its relatively large surface area reduces stress concentrations between it and the trowel blade. Even after prolonged periods of use, metal fatigue and ultimate breakage of the blade are substantially reduced or eliminated. The intermediate strip may be made of several types of materials, but preferably is of a conveniently weldable material such as cold-rolled or stainless steel, copper, or aluminum. If made of a weldable material, the studs 16 are easily welded onto the strip and neither the stud nor the strip nor the weld itself is weakened due to use of material not suitable for welding.

In one embodiment the adhesive material 18 used for bonding the strip and the handle to the blade is a curable, epoxy-based adhesive and preferably one that does not deteriorate upon contact with water and chemicals commonly found in such building materials as mastic, cement, or plaster. For satisfactory bonding, the adhesive is chosen from any of the various adhesives available having a tensile shear strength of at least 500 p.s.i. at ordinary room temperatures. Examples of such adhesives are those commercially available under the trade names Epon Adhesive 9601, Resiweld Adhesive 7004, and 3M Metal Laminating Adhesive PA–4459. A variety of other commercial adhesives may also be used.

Epon Adhesive 9601 is particularly suitable for use in conjunction with this invention because it is available in the form of a strip of permeable material such as nylon which is impregnated with an epoxy-based adhesive. In this form, a strip of adhesive of a length slightly greater than the length of strip 14 may be cut off of a continuous length of adhesive material.

In assembling the trowel, the cut strip is placed on the center of the trowel blade 6. In one embodiment the handle support is placed directly upon the adhesive and the assemby is cured. In another embodiment, the intermediate strip with the handle and support mounted thereon is disposed on the adhesive and the adhesive then subjected to the curing step. Curing is effected at a temperature not in excess of 450° F. Preferably, the curing takes place at a temperature from about 225° F. to 250° F. for one to one and one-half hours. To obtain a 100% bonding area, slight pressure is applied to the strip and the blade to produce release of air entrapped between them. The details of the curing process vary somewhat depending on the particular type of adhesive used. The trowel blade and the handle are thus secured to each other with a bond exhibiting high tensile and good peel strength.

The trowel blade 6 is preferably constructed of high carbon spring steel. Since flexibility of the blade is normally a desirable feature, the blade is made of a thin sheet of spring steel having a thickness measurement on the order of thirty thousandths (.030) inch or less.

As mentioned briefly above, in another preferred embodiment the planar flange of the support is constructed with a relatively wide, elongated configuration approximating the width and elongation of the strip 14 shown in the drawings. The support can then be directly bonded to the trowel blade without the use of the intermediate strip. This arrangement is particularly well adapted for use with a handle manufactured of several component parts, such as a flat, elongated metal strip for the base and an angular handle support which is secured to the base by welding, for example. It is less advisable for use in conjunction with cast metal handles which, of necessity, have to be relatively thick and rigid. This embodiment has the advantage that it not only eliminates the need for the intermediate strip but also the necessity of having to secure studs to the strip and to drill the holes in the flange.

In a third preferred embodiment, the handle and support is integrally constructed of a plastic material or fiber glass. The planar flange is again provided with a relatively wide and elongated configuration and is bonded directly to the blade without the need for an intermediate strip.

The advantageous physical and metallurgical characteristics of the trowel blade 6 are also incorporated in both the second and third preferred embodiments.

In addition to suitablility for use with hand trowels, the improvement of the above-identified application is also suited for use with long handled trowels and powered trowels. The former type of trowel is provided with a long pole extending from the trowel for providing an extended reach with the trowel and is frequently referred to as a "Fresno" trowel. Typically the pole is six to ten feet in length. As with the handle in the hand-held trowel, the pole is connected to the trowel by means of a support which is secured to the pole at one end and terminates in an elongated flange which is adhesively attached to the trowel blade at the other end.

A powered trowel is typically a multibladed apparatus with the plurality of trowel blades arranged in a circular configuration. In this type of trowel a support having an elongated flange at one end is joined to each trowel blade by means of an adhesive contact and is connected to a rigid frame at its other end by some suitable mechanical means. A source of mechanical power is then connected to the rigid frame for driving the trowels.

What is claimed is:
1. A trowel comprising:
 a trowel blade of spring steel having a thickness of less than thirty thousandths of an inch;
 handle means for manipulating the trowel;
 a support extending between the handle means and the trowel blade, said support terminating in an elongated flange at the end thereof adjacent the blade;
 an intermediate strip of weldable material disposed between the flange and the blade, the strip having a plurality of studs welded thereto, the support being secured to the studs;
 an epoxy-based adhesive material disposed between the intermediate strip and the trowel blade bonding the handle means and the support to the trowel blade, said adhesive material contacting the strip and the trowel blade over the entire surface area of the strip, the trowel being subjected to a temperature not in excess of 450° F. during the curing of the adhesive material.

2. A trowel according to claim 1 wherein the handle and support comprise one integral piece of a plastic material.

References Cited
UNITED STATES PATENTS 1,550,296  8/1925  Weiland _____ 15—235.4
3,183,539  5/1965  Hutton _____ 15—237 X

FOREIGN PATENTS 1,016,682  1/1966  Great Britain.

WALTER A. SCHEEL, Primary Examiner
LEON G. MACHLIN, Assistant Examiner

U.S. Cl. X.R.
306—44

PO-1050
(5/69)

UNITED STATES PATENT OFFICE
CERTIFICATE OF CORRECTION

Patent No. 3,460,183      Dated August 12, 1969

Inventor(s) Eugene M. Harrington

It is certified that error appears in the above-identified patent and that said Letters Patent are hereby corrected as shown below:

Col. 1, line 22, "material" should read --materials--;
    line 25, after "does" insert --not--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents